May 10, 1932.  A. C. BROWN  1,857,136
SINK FIXTURE
Filed May 3, 1929
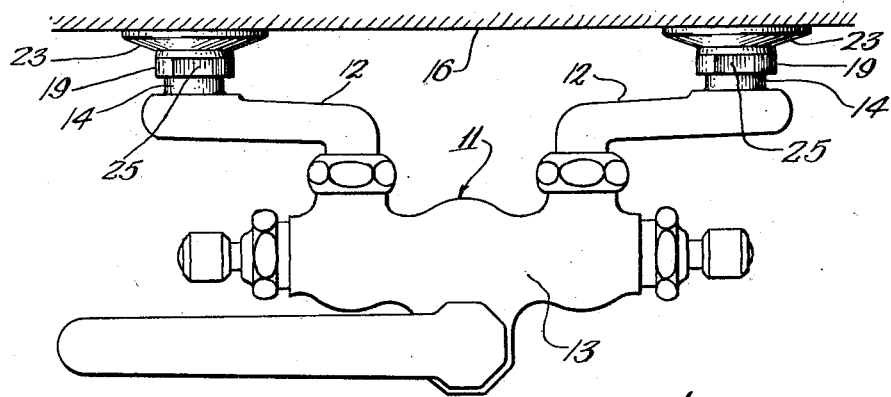
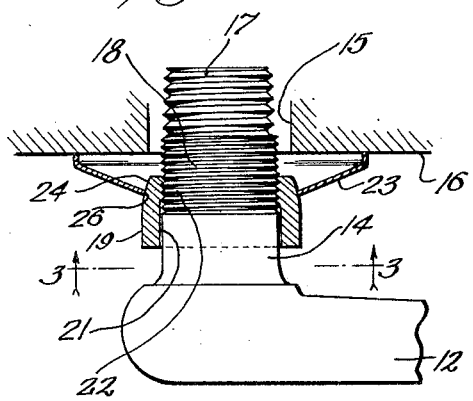
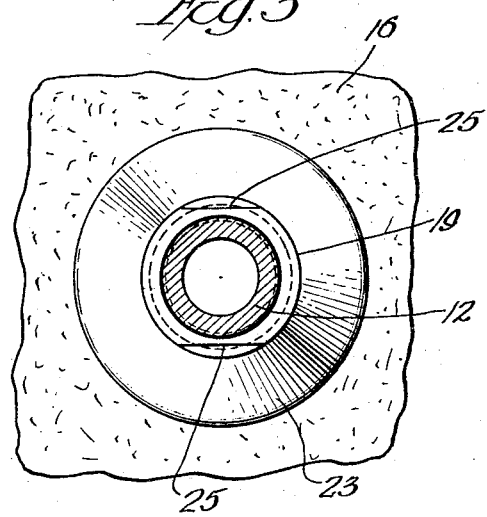
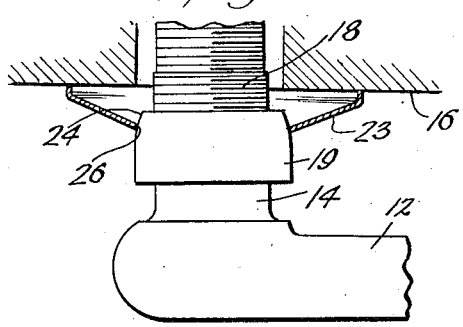
Inventor:
Albert C. Brown
John C. Carpenter
Atty:-

Patented May 10, 1932

1,857,136

UNITED STATES PATENT OFFICE

ALBERT C. BROWN, OF CHICAGO, ILLINOIS

SINK FIXTURE

Application filed May 3, 1929. Serial No. 360,027.

This invention relates in general to escutcheons which are ordinarily used as trimming on sink or bath fixtures, but has more particular reference to improvemnts in escutcheons and escutcheon fastening devices which are adapted to be readily installed and adjusted along a fixture so that the escutcheon, when positioned against a normally flat surface, will readily adjust itself parallel thereto.

Prior to my invention various means have been employed for fastening escutcheons in position along sink or bath fixtures. In some instances, escutcheons have been provided with set screws with which to fasten them in place, and in another instance the escutcheons have been provided with screw threads adapted to be threaded over a threaded portion provided on the fixture. Where set screws are used, there is a likelihood of marring the finish on the fixture, and where the escutcheons are threaded over the fixture several of the threads on the fixture are left exposed after the escutcheon has ben positioned. Furthermore, and in either instance, where the surface against which the escutcheons are positioned is not exactly at right angles with the portion of the fixture on which the escutcheon is mounted or is not parallel with the escutcheon, the escutcheons could not be positioned in parallel relation with the surface, thereby causing a portion of the escutcheon to be away from the surface of the wall instead of parallel against it.

Therefore, my invention contemplates the provision of an improved escutcheon and escutcheon fastening device which may be readily adjusted along a portion of a sink or bath fixture and the escutcheon positioned parallel against a surface which may or may not be exactly at right angles to the axis of the portion of a fixture over which the escutcheon and escutcheon fastening device is mounted.

The principal object of the invention is the provision of an escutcheon and escutcheon fastening device, the escutcheon of which, when fastened against the surface of a wall, will automatically adjust itself in position parallel with the wall.

Another important object of the invention is the provison of an escutcheon which is adapted to be universally arranged in parallel relation with a flat surface which may be at right angles with the true axis of its component clamping collar upon which it is mounted.

And another important object of the invention is the provision of a universally mounted escutcheon and its component clamping collar which, when arranged along the threaded portion of a faucet fitting and in position against the surface of a flat wall, will conceal the threads on said fitting resulting, generally, in a neat appearance of the faucet fixture thus arranged at this place.

Another important object of the invention is the provision of an escutcheon clamping collar which is adapted to have universal engagement with its component escutcheon and which may be readily adjusted along a portion of a faucet fitting when fastening the escutcheon in place.

Numerous other objects and advantages of the invention will be apparent as it is better understood from the following description, which, when taken in connection with the following drawings, discloses a preferred embodiment thereof.

Referring to the drawings:

Figure 1 represents a general arrangement of a faucet fixture as installed in relation to the wall of a sink or bath tub and shows my invention as positioned on the fixture and against a sink or bath tub wall;

Fig. 2 is an enlarged view of that portion of a faucet fixture which is extended into an opening in the wall of a sink or bath tub, and better illustrates the improvements as embodied in my invention, the escutcheon and its component clamping collar and the wall being shown in section;

Fig. 3 is a sectional view taken on the plane 3—3 of Fig. 2; and

Fig. 4 is a view similar to that of Fig. 2, but shows, instead, the surface of a sink or bath tub wall being not at right angles to the longitudinal axis of that portion of the fixture extending into the opening of the wall, or of the escutcheon clamping collar.

To illustrate my invention, I have shown on the drawings an arrangement of a faucet fixture, indicated generally by the reference character 11, as ordinarily connected to a cold and hot water supply, neither of the supply pipes being shown. Fittings 12, which connect faucet fitting 13 with the cold and hot water supply, each have a shank portion 14 thereof extended through an opening 15 in the wall of a sink or bath tub 16, the surface of which is normally flat and at right angles to the longitudinal axis of portions 14. Each of portions 14 has a series of external screw threads 17 and 18 arranged thereon, the threads 17 of which are adapted to make connections with the supply pipes (not shown) but the threads 18 are adapted to have engagement with a threaded escutcheon clamping collar 19.

Referring to Figures 2 and 4, it will be seen that the collar 19 has an opening 21, which has a portion thereof threaded, as at 22, to engage threads 18 on portion 14 of fitting 12, the unthreaded portion of the opening 21 extending beyond the threads 18 of portion 14 a sufficient distance so that the threads 18 will not become exposed when said collar 19 has been moved into position against escutcheon 23, as indicated in Figs. 1, 2, and 4. On one end of collar 19 is provided a spherical surface 24, and on the other end thereof is provided two opposite flat portions 25 by means of which the collar may be gripped, as by means of a wrench, and moved into position along the portion 14.

Escutcheon 23 is provided with a substantially central opening 26, which is adapted to embrace the shank portion 14 and engage the spherical surface 24 of collar 19 in any position in which the escutcheon may be positioned against a wall which may or may not be at right angles to the longitudinal axis of portion 14, or of the collar 19, as indicated in Figs. 2 and 4.

Escutcheons and escutcheon fastening devices constructed along the lines as above described provide a neat trimming on faucet fixtures arranged on the wall of a sink or bath tub, or on other fixtures similarly arranged, and since the escutcheon and the escutcheon fastening collar are adapted to have universal engagement with each other, the escutcheon will readily adapt itself in parallel relation with the wall against which it is fastened whether or not that wall be at right angles to the longitudinal axis of the escutcheon fastening collar, or of the fitting upon which said collar is mounted.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. A faucet, having a threaded shank for connection to a supply pipe and adapted to extend through a wall, an escutcheon embracing said shank, and a collar engaging said threads and pressing said escutcheon to the wall, said collar having a spherical surface for engagement with said escutcheon.

2. A faucet having a threaded shank for connection to a supply pipe and adapted to extend through a wall, an escutcheon embracing said shank, and a collar engaging said threads and pressing said escutcheon to the wall, said collar having an outer cylindrical surface merging at its bottom into a curved surface for engagement with said escutcheon.

ALBERT C. BROWN.